A. C. SAVIDGE.
DUST CAP FOR VALVES.
APPLICATION FILED MAY 22, 1916.

1,210,702.

Patented Jan. 2, 1917.

WITNESS
Frank A. Fahle

INVENTOR
Albert C. Savidge,

BY
Hood & Schley.
ATTORNEYS

UNITED STATES PATENT OFFICE.

ALBERT C. SAVIDGE, OF INDIANAPOLIS, INDIANA.

DUST-CAP FOR VALVES.

1,210,702.  Specification of Letters Patent.  Patented Jan. 2, 1917.

Application filed May 22, 1916. Serial No. 99,140.

*To all whom it may concern:*

Be it known that I, ALBERT C. SAVIDGE, a citizen of the United States, residing at Indianapolis, in the county of Marion and State of Indiana, have invented a new and useful Dust-Cap for Valves, of which the following is a specification.

It is the object of my invention to provide for the valve of a pneumatic tire a dust cap which is easily attached and removed without requiring to be screwed the whole length of a valve stem, which when in place may be firmly seated against its abutment, and which requires no axial pressure for effecting attachment or removal.

The accompanying drawing illustrates my invention.

Figure 1:
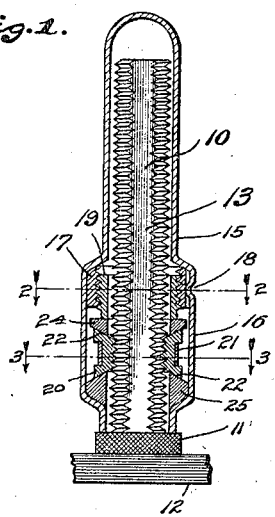
Figure 2:
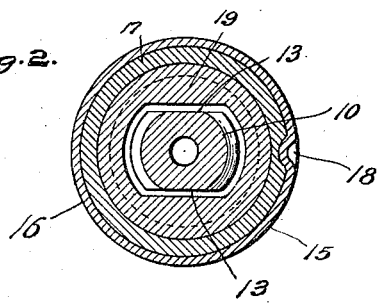
Figure 3:
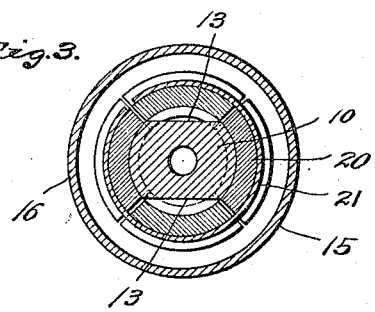

Figure 1 is a central axial section through a dust cap embodying my invention, showing it in place on a valve stem; Fig. 2 is an enlarged section on the line 2—2 of Fig. 1; and Fig. 3 is an enlarged section on the line 3—3 of Fig. 1.

The valve stem 10 is of the practically universal type, being provided with the usual nut 11 for clamping it in place on its associated wheel rim 12, through which it extends to the tire, being threaded throughout its length, and being provided with two opposite flat faces 13 for receiving a suitable wrench. I take advantage of these flat faces 13 for accomplishing the purpose of this invention.

My improved dust cap has an outer sheet metal shell 15, which is closed at one end in the usual manner and open at the other to receive the valve stem 10, being sufficiently long to receive the whole valve stem within it. This shell is enlarged for a portion of its length near its open end, but this enlarged portion 16 does not extend quite to the open end of the shell. Fixed in one end of this enlarged portion 16 is an annulus 17 which is threaded internally, and which is conveniently held against any movement in the shell 16 by a prick punch mark 18. Threaded within the annulus 17 is an externally threaded sleeve 19, which is shaped internally to fit fairly loosely against the flat faces 13 of the valve stem and to clear the outside edges of the screw threads on the valve stem, so that it can slide along the valve stem but is prevented from turning thereon, as clear from Fig. 2. Near that end of the sleeve 19 which is toward the open end of the shell 15 is a split nut 20, shown as having four parts (Fig. 3), which split nut is surrounded by a tightening spring 21 which tends to crowd the parts of the split nut together so that the threads on its interior engage with the threads on the valve stem 10. The two axial ends of this split nut are inwardly tapered, so as to form frusto-conical surfaces 22, which coöperate with similar surfaces on the adjacent axial ends of members 24 and 25, which are sufficiently large interiorly to clear the outer edges of the threads of the valve stem 10. The member 24 is interposed between the split nut 20 and the sleeve 19, and is shown as a separate member from such sleeve, though this separateness is not essential, the two parts 19 and 24 bearing against each other on coöperating plane faces. The member 25 is located in that end of the enlarged portion 16 which is toward the open end of the shell 15, and is held in place by the crimping in of such open end, as clear from Fig. 1.

By turning the shell 15, the annulus 17 is turned with it; but on account of the flat faces 13 of the valve stem the sleeve 19 is prevented from turning when the dust cap is in place on the valve stem. In consequence there is relative turning between the annulus 17 and the sleeve 19, and the engaging screw threads of such parts cause such relative turning to produce relative axial motion also. This relative axial motion causes the sleeve 19 to travel lengthwise in the enlarged portion 16 of the shell 15. When such travel is toward the open end of the shell (or downward in Fig. 1), it forces the members 24 and 25 together so that the coöperation of the frusto-conical faces on such members and on the split nut 20 spreads the parts of the split nut apart against the action of the spring 21 so as to clear the threads on the valve stem and permit the removal or attachment of the dust cap. When such travel is toward the closed end of the shell (or upward in Fig. 1), it permits the members 24 and 25 to separate so that the spring 21 may force inward the parts of the split nut so as to cause the threads on such split nut to engage the threads on the valve stem and thus lock the dust cap in place on the valve stem. This locking can take place with the dust cap in any place along the valve stem, for it is not essential that there be any axial thrust on the dust cap so as to produce a reaction against the clamping nut 11; but preferably the locking is done when the open end of the shell 15 is against the nut 11, so that by the turning which produces the locking the dust cap is carried axially more firmly into engagement with the nut 11 so as to form a dust-tight joint.

I claim as my invention:

1. A dust cap for valve stems, comprising an outer shell provided with an internally threaded part movable therewith, an externally threaded sleeve threaded in said internally threaded part and shaped internally so that it is movable axially on the valve stem but is prevented from turning on the valve stem, and a split nut the parts of which are spring-pressed inwardly into coöperative relation with the threads on the valve stem but are movable outwardly out of such coöperative relation by the axial movement of said sleeve relative to said shell.

2. A dust cap for valve stems, comprising an outer shell provided with an internally threaded part movable therewith, an externally threaded sleeve threaded in said internally threaded part and shaped internally so that it is movable axially on the valve stem but is prevented from turning on the valve stem, and a split nut the parts of which are spring-pressed radially in one direction but are movable radially in the other direction by the axial movement of said sleeve relative to said shell.

3. A dust cap for valve stems, comprising an outer shell, a sleeve shaped internally so that it is movable longitudinally of the valve stem but is prevented from turning thereon, said sleeve and said shell having a screw thread connection, and a split nut the parts of which are spring-pressed inwardly into coöperative relation with the threads on the valve stem but are movable outwardly out of said coöperative relation by the axial movement of said sleeve relative to said shell.

4. A dust cap for valve stems, comprising an outer shell, a sleeve shaped internally so that it is movable longitudinally of the valve stem but is prevented from turning thereon, said sleeve and said shell having a screw thread connection, and a split nut the parts of which are spring-pressed radially in one direction but are movable radially in the other direction by the axial movement of said sleeve relative to said shell.

5. A dust cap for valve stems, comprising an outer shell, a sleeve shaped internally so that it is movable longitudinally of the valve stem but is prevented from turning thereon, said sleeve and said shell having a screw thread connection, and a split nut the parts of which are spring-pressed inwardly into coöperative relation with the threads on the valve stem, said split nut having an inwardly tapered face at an axial end and said shell having an abutment between which and said sleeve said split nut is located, so that by turning said shell in one direction the resultant axial relative movement of said sleeve and abutment produces a cam action on said inwardly tapered face of a split nut between them to force the parts of said split nut out of coöperative relation with the threads on said valve stem.

6. A dust cap for valve stems, comprising an outer shell, a sleeve shaped internally so that it is movable longitudinally of the valve stem but is prevented from turning thereon, said sleeve and said shell having a screw thread connection, and a split nut the parts of which are spring-pressed radially in one direction, said split nut having a tapered face at an axial end and said shell having an abutment between which and said sleeve said split nut is located, so that by turning said shell in one direction the resultant axial relative movement of said sleeve and abutment produces a cam action on said tapered face of the split nut between them to force the parts of said split nut radially in the other direction against their spring, said split nut parts when moved radially in one direction coöperating with the threads on the valve stem and when moved radially in the other direction clearing such threads.

7. A dust cap for valve stems, comprising an outer shell, a sleeve shaped internally so that it is movable longitudinally of the valve stem but is prevented from turning thereon, said sleeve and said shell having a screw thread connection, and a split nut the parts of which are spring-pressed inwardly into coöperative relation with the threads on the valve stem, said split nut having an inwardly tapered face at each axial end and said shell having an abutment between which and said sleeve said split nut is located, so that by turning said shell in one direction the resultant axial relative movement of said sleeve and abutment produces opposing cam actions on said inwardly tapered end faces of the split nut between them to force the parts of said split nut out of coöperative relation with the threads on said valve stem.

8. A dust cap for valve stems, comprising an outer shell, a sleeve shaped internally so that it is movable longitudinally of the valve stem but is prevented from turning thereon, said sleeve and said shell having a screw thread connection, and a split nut the parts of which are spring-pressed radially in one direction, said split nut having a tapered face at each axial end and said shell having an abutment between which and said sleeve said split nut is located, so that by turning said shell in one direction the resultant relative axial movement of said sleeve and abutment produces opposing cam actions on said tapered end faces of the split nut between them to force the parts of said split nut radially in the other direction against their spring, said split nut parts when moved radially in one direction coöperating with the threads on the valve stem and when moved radially in the other direction clearing such threads.

9. A dust cap for valve stems, comprising an outer shell, a sleeve mounted within said shell and shaped internally so that it is movable axially on the valve stem but is prevented from turning thereon, said sleeve and shell being interconnected so that when turned relatively to each other relative axial movement is also produced, and a split nut the parts of which are radially movable relatively to each other, said split nut and said sleeve being interconnected so that upon relative axial movement of said sleeve and shell radial movement of the parts of the split nut is produced.

10. A dust cap for valve stems, comprising an outer shell, a sleeve mounted within said shell and shaped internally so that it is movable axially on the valve stem but is prevented from turning thereon, and a split nut the parts of which are radially movable relatively to each other, said split nut being connected with said shell and said sleeve so that upon relative turning of said shell and sleeve radial movement of the parts of the split nut is produced.

In witness whereof, I have hereunto set my hand at Indianapolis, Indiana, this 13th day of May, A. D. one thousand nine hundred and sixteen.

ALBERT C. SAVIDGE.